(12) United States Patent
Engel

(10) Patent No.: US 7,708,221 B2
(45) Date of Patent: May 4, 2010

(54) PIVOTING ROLL ARRANGEMENT FOR KERNEL PROCESSING ASSEMBLY

(75) Inventor: Manfred Engel, Großsteinhausen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/393,301

(22) Filed: Feb. 26, 2009

(65) Prior Publication Data

US 2009/0223192 A1 Sep. 10, 2009

(30) Foreign Application Priority Data

Mar. 4, 2008 (DE) ........................ 10 2008 012 487

(51) Int. Cl.
*B02C 7/14* (2006.01)
*B02C 13/00* (2006.01)
(52) U.S. Cl. ..................... 241/232; 241/230; 56/16.4 B
(58) Field of Classification Search ................. 241/232, 241/230, 37, 231, 290, 285.3, 287; 56/16.4 B
See application file for complete search history.

(56) References Cited

U.S. PATENT DOCUMENTS

| 3,445,070 | A | * | 5/1969 | Verdier ......................... 241/37 |
| 4,074,866 | A | * | 2/1978 | Meder .......................... 241/30 |
| 4,339,083 | A | * | 7/1982 | Linzberger et al. ............. 241/37 |
| 5,154,364 | A |   | 10/1992 | Ketting |
| 5,816,511 | A | * | 10/1998 | Bernardi et al. .............. 241/230 |
| 6,685,118 | B1 | * | 2/2004 | Williams, Jr. ................ 241/232 |

FOREIGN PATENT DOCUMENTS

| EP | 1 600 049 | 11/2005 |
| GB | 2 056 878 | 3/1981 |
| RU | 2 250 136 | 4/2005 |
| SU | 686661 | 5/1979 |
| SU | 1213977 | 2/1986 |

OTHER PUBLICATIONS

Eurasian Search Report, Jul. 3, 2009, 3 Pages.

\* cited by examiner

*Primary Examiner*—Árpád Fábián-Kovács

(57) ABSTRACT

A kernel processing assembly includes a first roll supported in bearings on a first frame element and a second roll supported in bearings on a second frame element, that forms a slot with the first roll through which harvested crop can be conducted. A rotary bearing is arranged on the first side of the slot that retains the first frame element and the second frame element free to pivot against each other. A pre-load arrangement is arranged on the second side of the slot that pre-loads the first frame element and the second frame element against each other. The rotary bearing includes a shaft to which an eccentric is fastened that retains the first frame element free to pivot, and that the shaft is supported in bearings, free to rotate, relative to the second frame element, so that the width of the slot can be varied by rotating the shaft about its longitudinal axis.

9 Claims, 1 Drawing Sheet

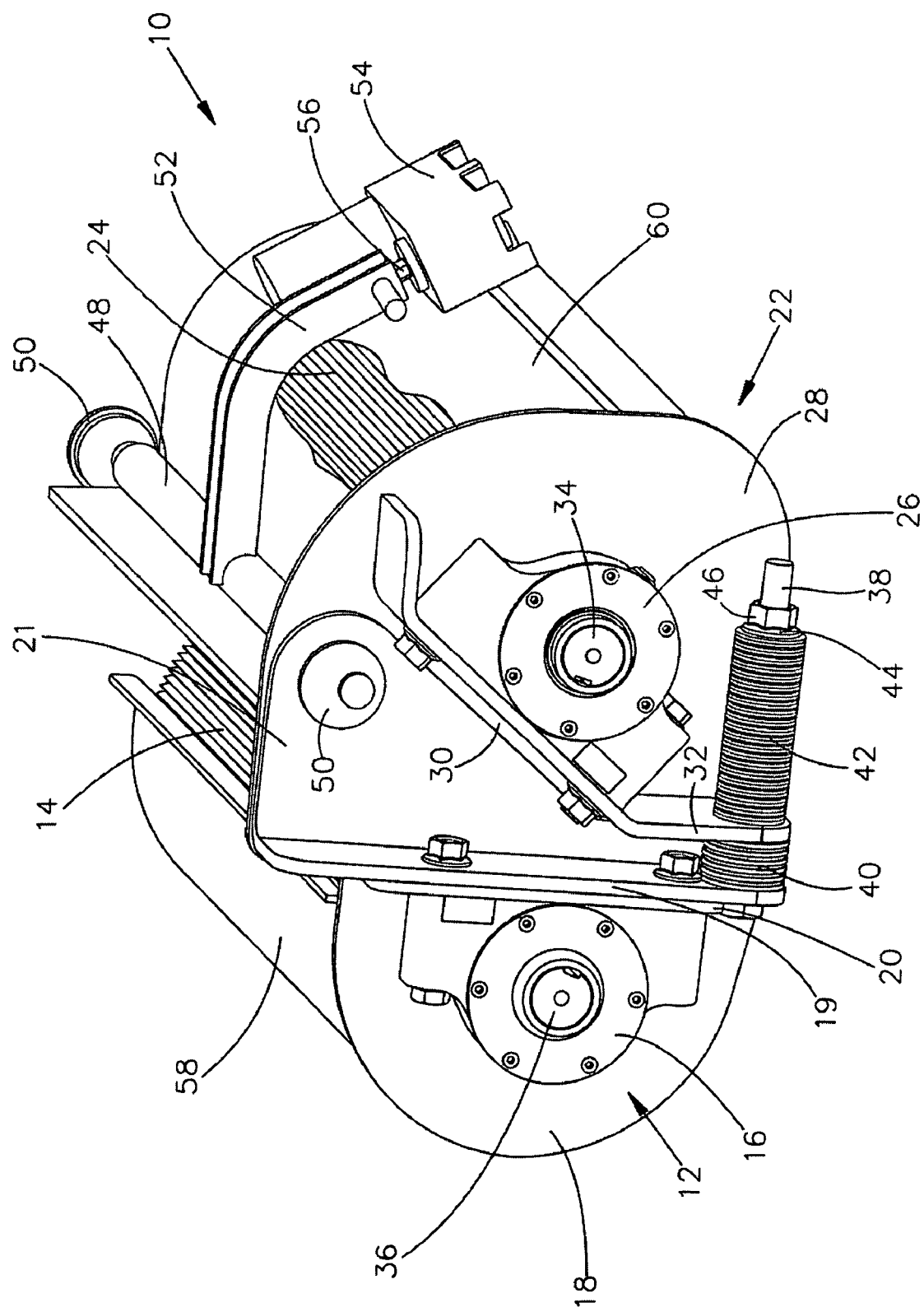

PIVOTING ROLL ARRANGEMENT FOR KERNEL PROCESSING ASSEMBLY

FIELD OF THE INVENTION

The invention concerns a kernel processing assembly for an agricultural harvesting machine. The kernel processing assembly includes a first roll, that is free to rotate, and that can be driven about its longitudinal axis and is supported in bearings on a first frame element. A second roll is provided, that is free to rotate and is also driven. The second roll supported in bearings on a second frame element and forms a slot with the first roll to which harvested crop that is to be processed can be conveyed. The first frame element and the second frame element are retained in a rotary bearing arrangement on the one side of the slot, free to pivot, about an axis that is parallel to the pivot axis and that extends parallel to longitudinal axes of the two rolls. A pre-loading arrangement is provided on the second side of the slot and pre-loads the first frame element and the second frame element against each other. Further, the spacing between the rolls is adjustable.

BACKGROUND OF THE INVENTION

Kernel processors are used in agriculture with crops that are to be used for fodder for animals, in order to open up the kernels so that they can be digested better.

Known kernel processing assemblies such as that described in EP 1 600 049 A are composed of two rolls, each of which is fastened to a frame. The two frames are connected on an (upper) side to each other by a pivot pin in the slot remaining between the rolls, they are connected to each other free to rotate about an axis, that extends parallel to the rolls and to their axes of rotation. On the second (lower) side of the slot a wedge can be inserted between the frame elements, in order to adjust the slot based upon the loss of the harvested crop throughput. The wedge is moved by means of a pivot arm that can be pivoted by a hydraulic cylinder. Moreover, the frames of the second side of the slot are pre-loaded against each other by a spring.

With this type of arrangement it is seen as a disadvantage that the means provided for the adjustment of the slot requires a relatively large amount of space.

DE 88 17 251 U describes a mill for cereal crops with several pairs of grinding rolls, of which one roll is fastened, free to pivot, to a first eccentric pin and can be moved by a cylinder between an engaged operating position and a disengaged non-operating position. The other roll can be readjusted for fine control by means of a spindle. The rolls form a slot that increases with greater throughput and are not fastened to frame elements that can be pivoted against each other by the force of a spring. Similarly, the kernel mill according to DE 102 35 241 A has a compression roll that is supported in bearings so as to pivot on an eccentric shaft and that can be readjusted for the change of the width of a compression slot by means of an operating lever.

SUMMARY OF THE INVENTION

It is therefore an object of the invention to provide a kernel processing arrangement that can be achieved in a compact space.

A kernel processing assembly, according to the invention, includes two rolls that are supported in bearings, free to rotate about their longitudinal axes and able to be driven. The rolls are supported in bearings on associated frame elements and leave a slot between them through which harvested crop can be conducted that is to be processed. A rotary bearing support is attached to a first side of a slot that retains the first frame element and the second frame element so as to pivot about an axis extending parallel to the longitudinal axes of the two rolls free to pivot relative to each other. On the second side of the slot a pre-loading arrangement is provided that pre-loads the first frame element and the second frame element against each other. The aforementioned rotary bearing arrangement includes a shaft that carries an eccentric, which is embodied as a circular cylindrical element whose central axis is offset relative to longitudinal axis of the shaft. The first frame element is supported in bearings, free to rotate, about the eccentric. Moreover, the shaft is supported in bearings relative to the second frame element, free to rotate.

Thus the distance between the two rolls can be varied by manual rotation of the shaft or rotation of the shaft actuated by external forces about the longitudinal axis.

In addition, the rotary bearing arrangement forms a mechanism for the readjustment of the width of the slot between the rolls and attains two functions simultaneously. The result is a very compact configuration of the kernel processing assembly.

Further, a spring can be used as a pre-loading arrangement that may be configured in particular, as a helical spring. Alternatively or in addition a so called force limiter may be used as a pre-loading arrangement, that provides an overload protection, that transmits forces acting between the frame elements, and transfers these forces from one frame element to the other frame element. As soon as an unloading force of the force limiter is exceeded, the flow of the force between the frame elements is interrupted so that at least one of the frame elements can evade the forces acting upon it. In a configuration using only one or several force limiters the spacing between the frame elements on the first side of the slot is accordingly constant and one of the frame elements evades to the outside only when, when a excessive flow of harvested crop or a rigid foreign object passes between the rolls since then the force limiter is released and interrupts the flow of the force. After removal of the obstruction the force limiter can be returned to its force transmitting position. It is also possible to shift the force limiter(s) with one or more springs in a row in order to create an insurance that an excessive flow of harvested crop or for the passage of a foreign object.

BRIEF DESCRIPTION OF THE DRAWINGS

An embodiment of the invention is explained on the basis of the single drawing FIGURE wherein a perspective view of a kernel processing assembly, according to the invention is illustrated.

DESCRIPTION OF THE PREFERRED EMBODIMENT

A kernel processing assembly 10, according to the invention, is shown in the FIGURE and is provided for a quick release installation in a forage harvester wherein it is located between a chopper drum and an ejection accelerator. For this purpose reference is also made to DE 101 28 052 A.

The kernel processing assembly 10 includes a first frame element 12, to which a first roll 14 having a profiled surface, for example, a saw toothed shaped surface, is supported in bearings, free to rotate, by means of a bearing arrangement 16 about the longitudinal axis of the roll 14. The first frame element 12 includes a plate 18 extending transverse to the axis of rotation of the roll 14 and a bridge 20 extending at right angles from the plate 18 away from the roll 14. The bearing arrangement 16 is fastened to the plate 18 by screw connections. The bridge 20 and the plate 18 may be welded to each other or may be configured as a one piece component. The bridge 20 is connected by the screw connection that is connected to the bearing arrangement 16, with a bridge 19 extending parallel to the bridge 20, that extends outward at a right angle from a further plate 21 and is configured as a one piece component or is welded.

Moreover, a second frame element 22 is provided to which a second roll 24 with a profiled surface (for example, a saw toothed shaped surface) is supported in bearings, free to rotate, by means of a bearing arrangement 26 about the longitudinal axis of the roll 24. The second frame element 22 includes a plate 28 extending transverse to the axis of rotation of the roll 14 and a bridge 30 welded to the plate 28 extending at right angles from the plate 28 and the roll 24, to which the bearing arrangement 26 is connected by screw connections. The bridge 30 includes a lower section 32 that is off set at an angle to the outside of approximately 45 degrees in the area of the bridge 30 against the bearing arrangement 26, and that extends at least approximately parallel to the bridge 19 of the first frame element 12. The plate 21 covers the plate 28 to the outside in the region above the bridge 30 and extends parallel to it.

The rolls 14, 24 include central shafts 34, 36 that can be brought into rotation by means of a belt pulley (not shown) arranged outside the bearing arrangement 16, 26, at rotational speeds, as a rule varying by a few percentage points from each other. The rolls 14, 24 take up the harvested crop during the harvesting operation in the slot remaining between them and open up kernels remaining in the harvested crop in order to make them easier to digest.

A bolt 38 equipped with a screw thread extends through a horizontal opening in the bridge 19 of the further plate 21 of the first frame element 12 and through an opening coaxial thereto in the lower section 32 of the bridge 30 of the second frame element 22. The bolt 38 is in contact via its head with the bridge 19. The ring 40 consisting of several washers is applied to the bolt 38 between the bridge 19 and the lower section 32 of the bridge 30. A helical spring enclosing the bolt 38 and used as a pre-load arrangement 42, is in contact with its first end with the lower section 32 of the bridge 30 and is in contact with its second end with a washer 44, that in turn is in contact with a nut 46 applied to the thread of the bolt 38. The nut 46 retains the pre-load arrangement 42 in a compressed position, until the ring 40 is in contact with the bridge 19 and is in contact with the lower end of the bridge 32 when harvested crop throughput is missing or is lower.

A shaft 48 extending parallel to the longitudinal and rotational axes of the rolls 14, 24 extends through an opening of the plate 28 of the second frame element 22 and is supported in bearings, free to rotate, relative to the plate 28, this may occur on the basis of a separate rolling contact bearing or by means of direct contact to each other. The shaft 48 is connected at its outer end, fixed against rotation, with an eccentric 50, that is a circular cylindrical element with a center axis offset relative to axis of the shaft. The eccentric 50 is arranged within an opening enclosing it in the further plate 21 of the first frame element 12, so that the latter can rotate relative to the eccentric 50, for example by means of a separate rolling contact bearing or due to direct contact with each other. The shaft 48 is connected with a lever 52 fixed against rotation, and further connecting elements 56 to an actuator 54 actuated by external forces in the form of an electric motor or a hydraulic cylinder with an output element that can slide in a linear direction that thereby is appropriate to permit the shaft 48 to rotate about its longitudinal axis. The housing of the actuator 54 is immobilized at the second frame element 22.

At their outer ends facing away from the slot between the rolls 14, 24, the rolls 14, 24 are covered by covers 58, 60 with semi-circular cross sections in order to avoid the escape of harvested crop and also to protect the actuator 54.

Further frame elements (not shown) are provided on the rear side (as seen from the FIGURE) of the rolls, that are symmetrical to the frame elements 14, 24 shown, which support the rolls 14, 24 by means of bearing arrangements (not shown) and that are pre-loaded against each other by means of a further spring (not shown). The second frame element at that location is also supported in bearing(s) on the shaft 48, free to rotate, while the first frame element at that location is supported in bearings, free to rotate, on the shaft 48 by means of an eccentric 50'.

The rolls 14, 24 enclose a slot between them that cannot be seen in the drawing and whose size is defined by the ring 40 and the rotary position when harvested crop throughput is lacking. While the rotary bearing support with the shaft 48 is located on a first (upper) side of the slot, then the preload arrangement 42 is located on the second (lower) side of the slot. As a rule, the second frame element 22 is fastened to the frame of the forage harvester, so that the first frame element 12 is able to rotate in the clockwise direction about the eccentric 50 when the harvested crop is incoming against the force of the pre-load arrangement 42. The pre-load arrangement 42 interacts with reference to the intake side of the slot, in terms of the flow of the harvested crop, between the rolls 14, 24, while the rotary bearing support is located on the outlet side of the slot between the rolls 14, 24. Accordingly, the slot between the rolls 14, 24 can be enlarged with increasing flow of harvested crop, in that the first frame element 12 with the first roll 14 pivots relative to the second frame element 22 with the second roll 24 about the central axis of the eccentric 50.

In order to change the width of the slot, the shaft 48 can be rotated about its longitudinal axis by means of the actuator 54. This leads to a rotation of the eccentric 50 relative to the first frame element 12 and hence to a sideways movement of the first frame element 12 relative to the second frame element 22. In this way an operator in the cab of a forage harvester can make the width of the slot and therewith the effect of the kernel processing assembly 10 conform to the actual harvesting conditions, in particular to conform to the actual moisture of the harvested crop. For the purpose of indicating the width of the slot to the operator or for feedback in the case of an automatic control of the width of the slot a detection of the actual width of the slot between the two rolls, 14, 24 or the position of the shaft 48 is determinable by means of an appropriate sensor. An automatic conforming of the width of the slot to the harvesting condition is also possible as is described in EP 1 166 619 A, whose disclosure is incorporated into the underlying document by reference.

Having described the preferred embodiment, it will become apparent that various modifications can be made without departing from the scope of the invention as defined in the accompanying claims.

The invention claimed is:

1. A kernel processing assembly, including:
   a first roll, that is supported in bearings at a first frame element so as to pivot and can be rotated about a longitudinal axis;
   a second roll that is supported in bearings and can be rotated about a longitudinal axis and supported in bearings at a second frame element and forms a slot together with the first roll through which harvested crop can be conducted;

a rotary bearing arranged on the first side of the slot that retains the first frame element and the second frame element free to pivot about an axis extending parallel to the longitudinal axes of the two rolls; and, a pre-load arrangement arranged on a second side of the slot that pre-loads the first frame element and the second frame element against each other, where the spacing between the rolls can be adjusted;

wherein the rotary bearing arrangement includes a shaft to which an eccentric is rigidly fastened the eccentric being supported in the first frame element via bearings so as to rotate, and the shaft being supported in the second frame element via bearings so as to rotate, so that the distance between the rolls can be varied by rotating the shaft about its longitudinal axis thereby rotating the eccentric and effecting a relative movement between the first frame element and the second frame element.

2. A kernel processing assembly according to claim 1, wherein the shaft can be rotated by one of manually or by an actuator actuated by external forces.

3. A kernel processing assembly according to claim 1, wherein the rotary bearing and the pre-load arrangement are arranged in each case on both ends of the rolls.

4. A kernel processing assembly according to claim 1, wherein the pre-load arrangement includes at least one of a spring or a force limiter.

5. A self propelled harvesting machine, particularly forage harvester, having a kernel processing assembly including:

a first roll, that is supported in bearings at a first frame element so as to pivot and can be rotated about a longitudinal axis;

a second roll that is supported in bearings and can be rotated about a longitudinal axis and supported in bearings at a second frame element and forms a slot together with the first roll through which harvested crop can be conducted;

a rotary bearing arranged on the first side of the slot that retains the first frame element and the second frame element free to pivot about an axis extending parallel to the longitudinal axes of the two rolls; and, a pre-load arrangement arranged on a second side of the slot that pre-loads the first frame element and the second frame element against each other, where the spacing between the rolls can be adjusted;

wherein the rotary bearing arrangement includes a shaft to which an eccentric is rigidly fastened the eccentric being supported in the first frame element via bearings so as to rotate, and the shaft being supported in the second frame element via bearings so as to rotate, so that the distance between the rolls can be varied by rotating the shaft about its longitudinal axis thereby rotating the eccentric and effecting a relative movement between the first frame element and the second frame element.

6. A self propelled harvesting machine, according to claim 5, wherein the second frame element is connected rigidly to the chassis of the harvesting machine.

7. A self propelled harvesting machine, according to claim 5, wherein the shaft can be rotated by one of manually or by an actuator actuated by external forces.

8. A self propelled harvesting machine, according to claim 5, wherein the rotary bearing and the pre-load arrangement are arranged in each case on both ends of the rolls.

9. A self propelled harvesting machine, according to claim 5, wherein the pre-load arrangement includes at least one of a spring or a force limiter.

* * * * *